United States Patent [19]

Udipi

[11] Patent Number: 4,994,524

[45] Date of Patent: Feb. 19, 1991

[54] RUBBER MODIFIED REACTION MOLDABLE NYLON-6 COMPOSITIONS

[75] Inventor: Kishore Udipi, Longmeadow, Mass.

[73] Assignee: Monsanto Company, St. Louis, Mo.

[21] Appl. No.: 225,111

[22] Filed: Jul. 27, 1988

Related U.S. Application Data

[63] Continuation-in-part of Ser. No. 808,781, Dec. 13, 1985, and a continuation-in-part of Ser. No. 808,792, Dec. 13, 1985.

[51] Int. Cl.$^5$ .............................................. C08L 77/02
[52] U.S. Cl. ...................................... 525/66; 525/178
[58] Field of Search ........................ 523/332; 524/104; 525/66, 178

[56] References Cited

U.S. PATENT DOCUMENTS

| | | | |
|---|---|---|---|
| 3,017,392 | 1/1962 | Butler et al. | 260/78 |
| 4,336,177 | 6/1982 | Backhouse et al. | 523/201 |
| 4,375,532 | 3/1983 | Baer | 525/310 |
| 4,419,465 | 12/1983 | Backhouse et al. | 523/201 |
| 4,427,820 | 1/1984 | Backhouse et al. | 524/504 |
| 4,448,956 | 5/1984 | Lenke et al. | 528/312 |
| 4,584,344 | 4/1986 | Baer | 525/66 |
| 4,590,243 | 5/1986 | Gabbert et al. | 525/184 |
| 4,598,125 | 7/1986 | Horn et al. | 525/183 |

*Primary Examiner*—Ana L. Carrillo
*Attorney, Agent, or Firm*—Thomas E. Kelley; Richard H. Shear

[57] ABSTRACT

Dispersions of core-shell polymers in caprolactam wherein the core-shell polymer comprises a crosslinked elastomer core and a hard thermoplastic shell prepared by adding an aqueous dispersion of core-shell polymer to an aqueous solution of caprolactam, stirring the mixture to provide a uniform dispersion and evaporating water from the mixture. Such dispersions can be combined with caprolactam polymerization initiator and caprolactam polymerization catalyst to provide rubber-modified nylon-6 polymers.

4 Claims, No Drawings

RUBBER MODIFIED REACTION MOLDABLE NYLON-6 COMPOSITIONS

This application is a continuation-in-part of copending applications Ser. No. 808,781 and Ser. No. 808,792, both filed on Dec. 13, 1985.

This invention relates to polymer dispersions of core-shell polymers in caprolactam, to processes for the preparation of such dispersions, to rubber modified nylon-6 polymers prepared from such dispersions and to reaction molding processes for preparing such nylon-6 polymers.

Unmodified nylon polymers are generally regarded as "tough thermoplastics" since they exhibit good elongation, high energy to break and high energy absorption in falling dart tests. However, they are notch sensitive, i.e., they are not resistant to crack propagation and this often results in brittle or catastrophic failure. Incorporation of an elastomer as a dispersed phase helps overcome this deficiency and there is much prior art in the literature related to this. Such elastomers are normally dispersed in nylon polymers by melt blending under high shear and the polymers so toughened exhibit greatly reduced notch sensitivity and ductile failure. They are, however, characterized by a very broad distribution of elastomer particle size which diminishes the efficiency of toughening.

In the case of nylon-6 polymers prepared by reaction injection molding (RIM) or by transfer molding where caprolactam monomer is polymerized in a mold, the above toughening method by dispersion of an elastomer in the nylon is not applicable. Instead, nylon-6 reaction molded products are toughened by block copolymerizing caprolactam with low molecular weight telechelic polymers such as functionalized polyethers and polybutadienes. Since nylon-6 and telechelic polymers such as polyethers and polybutadienes are incompatible, they form separate phases in the block copolymers. The particle size of the elastomer phase in such systems may be expected to be small and fairly uniform, but is not readily adjusted for efficient reinforcement because of the restrictions on phase separation related to the placement of the elastomeric segments within the backbone of the block copolymer. Also these low molecular weight elastomeric segments can exert a plasticizing effect on the block copolymer and cause a substantial lowering of the flexural modulus.

I have found a method of toughening reaction molded nylon-6 by the use of a preformed rubber graft of core-shell morphology containing a soft rubber or elastomer core and a hard thermoplastic shell. In the method, a dispersion of core-shell polymer in caprolactam is prepared and the dispersion is subjected to caprolactam polymerization conditions to provide a nylon 6 with core-shell polymer dispersed therein. Throughout this description, caprolactam is the epsilon isomer, namely 2-oxohexamethylene imine.

One aspect of the present invention is directed to dispersions of core-shell polymer in caprolactam. More particularly the invention is directed to dispersions of a core-shell polymer in caprolactam wherein the core-shell polymer comprises a crosslinked elastomer core and a hard thermoplastic polymer shell and wherein the weight ratio of crosslinked elastomer core to caprolactam is in the range of about 1:99 to about 40:60, preferably about 5:95 to about 30:70.

In another aspect of the invention such dispersions may also contain a caprolactam polymerization initiator to provide a dispersion suitable for mixing with a caprolactam polymerization catalyst to yield a reaction mixture capable of being reaction molded into a shaped plastic part. Such caprolactam polymerization initiator is preferably selected from the group represented by the formula

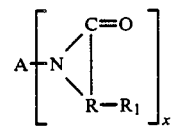

where A is CO, CS, B(CO)$_x$, B(CS)$_x$, B(NHCO)$_x$,

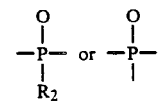

where B is a C$_1$ to C$_{30}$ hydrocarbyl radical, where x is in the range of 1 to 4, where R is a C$_4$ to C$_{11}$ alkylene or oxoalkylene radical, R$_1$ is hydrogen or a C$_1$ to C$_4$ alkyl radical and R$_2$ is a C$_1$ to C$_{10}$ hydrocarbyl radical.

Alternatively, such dispersions may also contain caprolactam polymerization catalyst to provide a dispersion suitable for mixing with a caprolactam polymerization initiator to yield a reaction mixture capable of being reaction molded into a shaped plastic part. Such caprolactam polymerization catalyst if preferably selected from the group consisting of lactam magnesium halides and alkali metal lactamates.

The present invention is further directed to compositions capable of being reaction molded which comprise such core-shell polymer dispersed in a solution of caprolactam containing an effective amount of a caprolactam polymerization initiator and an effective amount of a caprolactam polymerization catalyst.

Another aspect of the invention is directed to a rubber modified reaction molded nylon-6 composition comprising a core-shell polymer dispersed in nylon-6, wherein the core-shell comprises a crosslinked elastomer core and a hard thermoplastic polymer shell where the polymer shell comprises a graft copolymer of caprolactam. In some cases it is preferable that the graft caprolactam have a lactam ring end group.

Still another aspect of this invention is directed to processes for the preparation of the dispersions which comprise adding an aqueous dispersion of core-shell polymer to an aqueous solution of caprolactam or to molten caprolactam, stirring the mixture to provide a uniform dispersion, and evaporating water from the mixture.

And yet another aspect of the invention is directed to processes of reaction molding a rubber modified nylon-6 wherein two reaction compositions are intimately mixed and the mixture is added to a mold and subjected to reaction molding conditions until polymerization is essentially complete, wherein the first reaction composition comprises a caprolactam solution containing an effective amount of a caprolactam polymerization initiator, wherein the second reaction composition comprises a caprolactam solution of an effective amount of a catalyst for caprolactam polymerization and wherein at least one of the first and second reaction compositions includes a dispersion of core-shell polymer.

The elastomer or rubber core of the core-shell polymer should be crosslinked in order to better preserve the particulate form on dispersion and to avoid excessive swelling by hot caprolactam. The hard shell, on the other hand, can prevent the particles from sintering during processing and at elevated temperatures such as those employed to polymerize caprolactam. Furthermore, the composition of the shell can be varied to make it compatible or interactive with nylon-6 matrix. In order for the shell to be compatible with polycaprolactam, it may consist of a proportion of suitably polar monomers like (meth)acrylonitrile or N-substituted (meth)acrylamides.

To obtain efficient toughening of nylon-6 polymer, the particulate rubber should be colloidally dispersed as particles of average diameter in the range of about 0.1 to 0.8 micron in caprolactam monomer. Such a particle size is achieved either by choice of polymerization conditions or by using agglomeration techniques known to those skilled in the art. The particulate rubber is colloidally dispersed by addition of the core-shell polymer emulsion or a wet cake of core-shell polymer obtained from such emulsion to caprolactam or an aqueous solution of caprolactam, dispersion of the latex particles in the caprolactam solution, and removal of water from the solution to provide a fine dispersion of latex or agglomerated latex in caprolactam. The dispersions can be subjected to caprolactam polymerization conditions to allow high conversions while still maintaining the dispersion of core-shell polymer free of clumping or sintering.

The core-shell polymer used in the dispersions, compositions and processes of the present invention is preferably an elastomer based composite multiphase interpolymer material having a crosslinked elastomer core and a hard or rigid thermoplastic polymer shell advantageously in a weight ratio of core to shell in the range of about 9:1 to about 1:1.

The elastomer core can be a diene elastomer, an acrylic elastomer, or a polyurethane elastomer. The diene elastomers include polybutadiene, polyisoprene, polychloroprene and poly(cyanobutadiene) and copolymers of diene elastomers such as an ethylene-propylenediene rubber. For instance, the diene may also be copolymerized with up to about 50 weight percent of other monomers such as alkyl acrylates and methacrylates, styrene, α-methylstyrene, acrylonitrile and substituted acrylonitriles, vinyl ethers, vinyl amides, vinyl esters and the like. The acrylic elastomers comprise 50 to 99.9 parts by weight of an alkyl acrylate containing 1 to 10 carbon atoms, preferably 2 to 8 carbon atoms, 0 to 40 parts by weight of other ethylenically unsaturated monomers and 0.1 to 5 parts by weight of a polyunsaturated crosslinking monomer such as polyacrylic and polymethacrylic esters of polyols such as butylene diacrylate and dimethacrylate, trimethylolpropane trimethacrylate and the like, vinyl acrylate and methacrylate, divinyl and trivinyl benzene and the like. Optionally from about 0.1 to about 5 parts by weight of a graft-linking monomer with two or more addition polymerizable unsaturated groups which participate in polymerization at different rates, may also be included. It is preferred that the graft-linking monomer has at least one reactive group which polymerizes at about the same rate, or slightly slower than the other monomers, while the remaining reactive group or groups polymerize at a substantially slower rate. The differential polymerization rates result in a residual level of unsaturation in the elastomer core, particularly during the later stages of polymerization and, consequently, at or near the surface of the elastomer particles. Such graft linking monomers include allyl (meth)acrylates for acrylic systems, diene monomers in ethylene-propylendiene rubbers, and monallyl ethers of polyols incorporated into urethane elastomers. The diene elastomers provide crosslinking sites at their unsaturated groups but sites may also be formed by copolymerization with monomers such as allyl (meth)acrylates. When the rigid thermoplastic shell is subsequently polymerized at the surface of the elastomer, the residual unsaturated addition-polymerizable reactive groups contributed by the graft-linking monomer participate in the subsequent reaction so that at least a portion of the rigid shell is chemically attached to the surface of the elastomer. The crosslinked elastomer core preferably has a glass transition temperature below about $-25°$ C. and a swelling index in caprolactam of less than about 2.

The elastomeric core is prepared in bulk, in emulsion or in solution. Those prepared in bulk or solution are converted into aqueous emulsion by known techniques prior to the addition polymerization of the rigid polymer shell thereto.

Monomers for the formation of the hard or rigid thermoplastic polymer shell are selected so that the rigid polymer has moderate to high polarity and possesses a glass transition temperature at least about $35°$ C. The relatively high polarity provides a degree of compatibility of the rigid thermoplastic polymer with caprolactam and its polymer and hence it is believed that the dispersibility of the core-shell polymer in caprolactam and the stability of the dispersion is enhanced so that a uniform dispersion of particles of elastomer of about the same size as the original elastomer latex and efficient toughening of the nylon-6 polymer are achieved. In many cases the graft copolymer can comprise up to at least about ten weight percent of polar monomer. The polar monomers may be selected from ethylenically monounsaturated monomers such as $C_1$ to $C_8$ alkyl (meth)acrylates, vinyl esters, (meth)acrylonitrile, (meth)acrylamide, vinyl pyrrolidone, vinyl urea and N-vinylimides. Among the preferred polar monomers are methyl methacrylate, acrylonitrile and methacrylonitrile. Nonpolar monomers such as styrene may be used as comonomers in the graft polymer in a concentration up to about 90 weight percent of the graft polymer. A preferred graft copolymer comprises styrene and acrylonitrile in the weight ratio of about 9:1 to about 6:4, providing a suitably rigid shell to protect the core from sintering and a sufficient compatibility with caprolactam to provide stability to the caprolactam dispersion.

The multiphase core-shell polymers are advantageously prepared by emulsion polymerization of the shell comonomers in the presence of an emulsion of the elastomer core by known techniques which favor the formation of rigid thermoplastic polymer shell around the elastomer core rather than discrete particles of rigid polymer separate from the core.

The elastomer core emulsion is advantageously of weight average particle diameter in the range of about 0.1 to about 0.8 micron and the thickness of the rigid polymer shell calculated from the weight- added to the core elastomer should be sufficient to prevent coalescence and sintering during processing, preferably at least about 0.015 micron. Preferably the particle diameter is in the range of about 0.15 to about 0.7 micron to provide an advantageous proportion of rigid polymer shell to elastomer core necessary to prevent coalescence and sintering of the emulsion particles during the dispersion of the core-shell polymer in caprolactam.

When the elastomer core comprises a butadiene polymer or an acrylic polymer prepared by emulsion polymerization, the particle size is generally in the range of about 0.1 to about 0.2 micron. Seeding techniques can provide emulsions of larger particle size. However, since emulsion polymerization conditions which favor the formation of large particle size, may cause a significant degree of coagulation of the elastomer core causing kettle fouling and detracting from the formation of fine, uniform dispersions of the multiphase core-shell polymer in caprolactam and the nylon-6 derived therefrom, it is generally preferred to form butadiene and acrylic elastomer core emulsions of large particle size in the range of about 0.3 to about 0.8 micron by controlled agglomeration of emulsions of 0.1 to 0.2 micron particle size. Agglomeration may be achieved by any conventional means such as by the addition of a suitable amount of water soluble, carboxylic acid or anhydride of such acid. The agglomerated emulsion is then stabilized by addition of a suitable emulsifier.

The amount of elastomer core in the multiphase core-shell polymer may range from about 40 to about 90 parts by weight with about 10 to about 60 parts by weight of rigid polymer shell applied thereto. More preferably, the amount of elastomer core is in the range of about 60 to about 80 parts by weight and the amount of rigid polymer shell is in the range of about 20 to about 40 parts by weight.

Polymerization of the rigid polymer shell is carried out under conditions which favor polymerization at or onto the surface of the elastomer core emulsion so that no substantial number of new "seeds" or particles form in the emulsion. This is generally accomplished by controlling the amount of emulsifier and initiator and by controlling the rate of addition of monomer, emulsifier and initiator. Preferably no further emulsifier is added after formation of the core elastomer emulsion. When polymerization is substantially complete, the multiphase core-shell polymer may be used as an aqueous latex for dispersion in caprolactam or it may first be coagulated by any convenient method such as by freezing, by addition of a coagulating solvent such as methanol optionally containing a small amount of strong acid such as hydrochloric acid, or by addition of an aqueous solution of a polyvalent metal salt such as magnesium sulfate or aluminum sulfate. The coagulated emulsion is filtered, washed thoroughly with water to remove emulsifiers and salts and the filter cake is added to caprolactam or an aqueous solution of caprolactam and dispersed therein with stirring.

After the aqueous core-shell polymer has been uniformly dispersed in caprolactam, the aqueous solution is distilled or stripped with nitrogen purge at atmospheric pressure of under reduced pressure until all the water is removed. The dispersion of core-shell polymer in caprolactam can then be stored for later use in the preparation of rubber modified nylon-6 or it may be formulated with a caprolactam polymerization initiator to give a first reaction composition or with a caprolactam polymerization catalyst to give a second reaction composition containing respectively an effective amount of caprolactam polymerization initiator or caprolactam polymerization catalyst and subsequently such compositions containing dispersed core-shell polymer can be used in the preparation of rubber modified nylon-6. Advantageously, the weight concentration of rubber or elastomer required to toughen nylon-6 without appreciable decrease in the flexural modulus is in the range of about 1 to about 30 parts per 100 parts by weight. Advantageously dispersions with suitable viscosity for mixing with the other components of the reaction mixtures which upon polymerization yield rubber modified nylon-6 polymers, contain from about 1 to about 30 parts by weight of rubber or elastomer per 100 parts by weight of caprolactam and preferably from about 5 to about 30 parts by weight of rubber or elastomer per 100 parts by weight of caprolactam. Such first and second reaction compositions containing dispersed core-shell polymer are generally mixed together, or a first reaction composition containing dispersed core-shell polymer can be mixed with a second reaction composition comprising a solution of caprolactam polymerization catalyst, or a second reaction composition containing dispersed core-shell polymer can be mixed with a first reaction composition comprising caprolactam polymerization initiator to provide the final reaction mixture which polymerizes rapidly to form the rubber modified nylon-6 composition.

Suitable caprolactam polymerization initiators for addition to the core-shell polymer dispersion in caprolactam include those represented by the formula

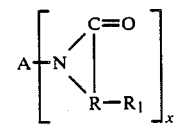

where A is CO, CS, B(CO)$_x$, B(CS)$_x$, B(NHCO)$_x$,

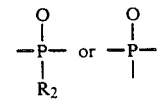

where B is a C$_1$ to C$_{30}$ hydrocarbyl radical, where x is in the range of 1 to 4, where R is a C$_4$ to C$_{11}$ alkylene or oxoalkylene radical, R$_1$ is hydrogen or a C$_1$ to C$_4$ alkyl radical and R$_2$ is a C$_1$ to C$_{10}$ hydrocarbyl radical. Preferred polymerization initiators are the bisacyllactams wherein A is B(CO)$_2$, B is a C$_4$ to C$_{10}$ hydrocarbyl radical, R is a C$_3$ or C$_5$ alkylene radical and R$_1$ is hydrogen. Especially preferred for fast polymerization initiation are the bisacyllactams in which B is a meta- or para-phenylene radical.

Suitable caprolactam polymerization catalysts for addition to the core-shell polymer dispersion in caprolactam include lactam magnesium halides and alkali metal lactamates prepared in caprolactam solution by methods well known in the art. For fast polymerization catalysts with acyllactam initiators, lactam magnesium halides can be selected. Preferred lactam magnesium halides include caprolactam and 2-pyrrolidinone magnesium bromides. The amounts of caprolactam polymerization initiator and caprolactam polymerization catalyst added to individual dispersions of core-shell polymer in caprolactam are such that they are effective to initiate or to catalyze caprolactam polymerization in the final reaction mixture comprising core-shell polymer, caprolactam, caprolactam polymerization initiator and caprolactam polymerization catalyst. Advantageously the amounts are sufficient to provide substantially complete polymerization of the caprolactam to nylon-6 in at least about 15 minutes at a reaction temperature in the range of about 130° to about 180° C. Satisfactory rates are generally obtained with about 2 to about 20 meg of initiator, in excess of any reactive groups of the graft polymer shell, per mole of caprolactam and with about 0.1-20 mole catalyst per mole of caprolactam.

It may, also, be desirable for the shell to contain reactive monomers capable of participating in caprolactam polymerization in which case the rubber particles would be chemically bonded to the nylon matrix through the grafted shell. Such reactive monomers can include, among others, hydroxyalkyl (meth)acrylates, (meth)allyl alcohol, and glycidyl (meth)acrylate. Advantageously the concentration of such reactive comonomers interpolymerized into the hard shell is in the range of about 1 to about 10 parts per 100 parts by weight of shell to provide a suitable amount for grafting of caprolactam thereto.

When the graft polymer of the shell of the core-shell polymer contains a copolymerized reactive monomer such as a hydroxy or glycidyl functionalized monomer, it can be advantageous to react the anhydrous caprolactam dispersion with a polyisocyanate, a polyacyllactam, a polythioacyllactam, a polyimide or a polyureide to provide initiator units on the graft polymer capable of initiating anion polymerization of caprolactam and hence capable of allowing graft polymerization of caprolactam onto the graft polymer to provide enhanced compatibility with the nylon-6 polymer formed at the subsequent polymerization step. Such anion polymerized grafts of caprolactam are characterized as having lactam ring end groups. The polyisocyanates are represented by the formula $B(NCO)_x$ the polyacyllactams, polythioacyllactams and polyimides are represented by the formula

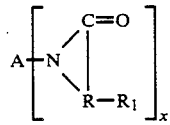

where A is CO, CS, $B(CO)_x$ respectively, and the polyureides are represented by the formula

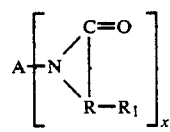

where A is

and where B is a $C_1$ to $C_{30}$ hydrocarbyl radical, x is in the range of 2 to 4, R is a $C_4$ to $C_{11}$ alkylene or oxoalkylene radical and $R_1$ is a hydrogen or a $C_1$ to $C_4$ alkyl radical. Alternatively the graft copolymer of the shell can have other lactam ring functional monomers, such as adducts of caprolactam and isocyanato alkyl (meth)acrylates, which will serve as initiator sites for anion polymerization of caprolactam.

The reaction providing initiator sites on the shell polymer is advantageously carried out prior to the mixing of the ingredients for lactam polymerization and is catalyzed with a catalyst which is inactive as a caprolactam polymerization catalyst. Such catalysts include zinc caprolactam, calcium caprolactam, barium caprolactam, aluminum caprolactam, and magnesium caprolactam. Alternatively the reaction is carried out in situ in the lactam polymerization mixture and is catalyzed by the lactam polymerization catalyst.

In order to polymerize the dispersion of core-shell polymer in caprolactam in a mold, a final reaction mixture containing effective amounts of initiator and catalyst is prepared and poured into the mold. Mixing can be done by hand or by pumpcasting. In pumpcasting, a dispersion containing initiator is added to one of two reservoirs and a solution of caprolactam magnesium bromide in caprolactam is added to the other. The contents of the two reservoirs are pumped together, mixed intimately through a series of static mixers and the mixture is fed into the mold. The ratio of the dispersion to catalyst solution is adjusted by setting the two pumps at appropriate speeds.

Polymerization is generally carried out at a mold temperature in the range of 130° to 160° C. and the casting is held in the mold for about 15 minutes. The peak temperature of the exotherm is normally achieved in less than 5 minutes.

The caprolactam dispersions of the present invention may be modified by one or more conventional additives such as stabilizers and inhibitors of oxidative, thermal, and ultraviolet light degradation. The oxidative and thermal stabilizers useful in the materials of the present invention include those used in polyamides, elastomers and addition polymers generally. They include, for example, Group I metal halides, e.g., sodium, potassium, and lithium, with cuprous halides, e.g., chloride, bromide, iodide, and also hindered phenols, hydroquinones, phosphites and varieties of substituted members of those groups and combinations thereof. Ultraviolet light stabilizers, can include various substituted resorcinols, salicylates, benzotriazoles, benzophenones, and the like. Lubricants and mold release agents, colorants, nucleating agents, plasticizers, glass fiber or fibrous and particulate inorganic fillers can also be added to modify the properties of the nylon-6 product obtained from the dispersions. The following examples illustrate the invention. Parts and percentages are by weight unless otherwise indicated. The examples were tested for various properties substantially in accordance with the following procedures:

Flexural Modulus: ASTM D638 (units are megapascals,MPa)

Notched Izod Impact Strength: ASTM D256 (units are joules per meter, J/m)

Standard Exotherm: A 30 gauge iron constantan thermocouple connected to a recording potentiometer, is positioned within a mold. The mold is heated to 160° celcius (C.). A final reaction mixture is heated to about 100° C. and is introduced into the mold by pumpcasting and the temperature response is recorded. The thermal trace starts an immediate rise due to .heat contributed by the mold and the initial exotherm of the lactam polymerization. Before the temperature levels, a second sharp rise may occur, which is believed to be due to heat of crystallization and heat from the final stage of polymerization. The polymerization is considered to be complete when the temperature reaches a maximum and starts to fall. The mass is quite solid and the molded article may now be removed from the mold. The reaction time is the time interval between the addition of the reaction mixture to the mold and the attainment of maximum temperature. The overall reaction rate is considered to be proportional to the time for the temperature rise.

Particle Size: Measurement of latex particle size was done with a Coulter ® Nanosizer. The instrument measures the weight average size of particles in suspensions or emulsions between 40 and 3000 nm (i.e. 0.04 and 3 µ) diameter. The measuring principles used are those of Brownian motion and autocorrelation spectroscopy of scattered laser light. In order to determine the particle size, the latex is filtered through 4 layers of cheesecloth and using an eyedropper, a drop of filtered latex is added to 400 ml of distilled water containing one ml of 10% Triton ® X-100 solution in a clean, 500 ml volumetric flask and mixed well. The sample tube is first rinsed several times with the above solution and then half-filled and placed in the cellholder. The gain setting on the instrument is adjusted to 50±5 and the normalization constant set to corresponding ambient temperature. The appropriate particle size range is then determined by setting the range knob to automatic and time to 2 minutes. Finally, the range knob is set to the appropriate level and the particle size is recorded in 2 minutes.

EXAMPLE 1

Preparation of Butadiene Copolymer Latices

A butadiene-acrylonitrile copolymer latex is produced by polymerizing a mixture of 93 parts by weight of butadiene and 7 parts by weight of acrylonitrile at 75° C. to 98 percent conversion with a persulfate initiator. The latex has a solids content of 45% and a weight average particle size of 0.20 micron.

EXAMPLE 2

Preparation of Multiphase Core-Shell Polymer

The latex example containing 100 parts by weight of butadiene-acrylonitrile copolymer of 0.2 micron weight average particle size is charged to a reaction kettle fitted with a temperature controller, two calibrated holding tanks (for monomer and persulfate solution additions), a baffle, a Teflon bladed agitator, and a condenser. The batch is purged by bubbling nitrogen into it through a sparger for about 15–20 minutes while the batch is gently stirred and brought to 80° C.

A monomer mixture containing 17.5 parts by weight styrene, 7.5 parts by weight acrylonitrile, and 0.125 parts of t-dodecyl mercaptan, and an aqueous solution of potassium persulfate containing 0.375 parts of persulfate in 30 parts by weight of water, are prepared.

The monomer mixture and the persulfate solution are charged to the holding tanks and are also purged by bubbling nitrogen for about 5–10 minutes. A nitrogen atmosphere is maintained in the kettle and tanks throughout the course of polymerization.

When the kettle contents reach 80° C., about 10–15% of the monomer and initiator charge are added to the batch. The batch is stirred for about 15 minutes. At the end of this time, the continuous addition of the streams of monomer and catalyst is started. The rate of addition of the two streams is adjusted to complete the addition in about 4 hours. Polymerization at 80° C. is then continued for an additional hour. Monomer conversion is 95 percent. At the end of polymerization, the batch is filtered through cheesecloth. In general very little coagulum is obtained despite the fact that no additional emulsifier is charged during the course of polymerization.

When Method B of Example 3, below, is followed, to the filtered latex is added an aqueous emulsion containing 25% by weight of mixed alkylated aryl phosphites, sold by Uniroyal Corp. under the tradename Polygard ®, and 12.5% by weight of 2,6-di-t-butyl-4-methylphenol, sold by Shell chemical corp. under the tradename "Ionol." The amount added is designed to give 2 parts Polygard and 1 part Ionol per 100 parts of copolymer. The resulting stabilized latex is divided into two portions. One portion is coagulated by adding it to a 3% aqueous solution of magnesium sulfate hexahydrate at 95°–98° C. A ratio of 2–3 volumes of magnesium sulfate solution for 1 volume of latex is used. The coagulated material is filtered and washed several times on the filter with cold, filtered water. Most of the water is removed by vacuum filtration or by centrifugation to provide a butadiene-styrene copolymer cake.

EXAMPLE 3

Preparation of Core-Shell Polymer Dispersion in Caprolactam

Method A

An 80 wt. % aqueous solution of caprolactam containing 0.5 wt. % 2,2,4-trimethyl-1,2-dihydroguinone, an antioxidant available from Monsanto company under the tradename Flectol ® H, is charged to a four necked round bottom flask fitted with a mechanical stirrer, thermometer with a temperature controller, a nitrogen inlet and a distillation head. The filtered latex, prior to stabilization, of Example 2 is then slowly added at room temperature with good agitation. The contents in the flask are gradually heated to about 90°–100° C. with a good nitrogen sweep to strip off water. When all the water is stripped off, isophthaloyl bisoaprolactam initiator is added and the temperature is raised to 130° C. Some caprolactam is distilled over to obtain a water free dispersion suitable for subsequent anionic polymerization.

Method B

The aqueous filter cake of core-shell polymer obtained in Example 2 is added to a reaction flask. An 80 wt. % aqueous solution of caprolactam containing 0.5 wt. % 2,2,4-trimethyl-1,2-dihydroguinoline, an antioxidant available from Monsanto company under the tradename Flectol ® H is added and the mixture is stirred gently until the cake has dispersed uniformly in the caprolactam solution. The dispersion is then dried by the method of Method A.

EXAMPLE 4

Preparation of Rubber-Modified Nylon-6

In the preparation of a rubber modified nylon-6, a first reaction composition consisting of 85.8 parts of the molten caprolactam dispersion obtained in Method A of Example 3 is mixed with a second reaction composition consisting of 14.2 parts of a 0.63M caprolactam magnesium bromide solution in caprolactam and the mixture is polymerized in a mold at 160° C. The two reaction compositions are pumped by two pumps set at appropriate speeds to maintain a constant mixture composition through a series of static mixers and the mixture is discharged into the hot mold. The mixture is held at the mold temperature for approximately 15 minutes. The peak temperature of the standard exotherm is achieved in less than 7 minutes.

EXAMPLE 5-17

Core-Shell Polymers

By the methods of Examples 1 and 2 the following core-shell polymers of Examples 5-17 were prepared. In Example 17, 0.5 ppm t-dodecylmercaptan was added to the monomer mixture of Example 2 to regulate the shell molecular weight, and the core-shell polymer latex was neutralized to ph 7.5 by adding Rexyn ® 201 ion exchange resin, available from Fisher chemical company, to the aqueous solution of caprolactam of Example 3, Method A.

TABLE 1

| Ex. | Core diam. (wt. avg., $\mu$) | Core:shell (wt. ratio) | Core Composition* BD/AN/S | Shell Composition* S/AN/X |
|---|---|---|---|---|
| 5 | 0.17 | 100:25 | 93/7/0 | 70/30/0 |
| 6 | " | " | " | 90/10/0 |
| 7 | " | " | " | 100/0/0 |
| 8 | " | 100:40 | " | 70/30/0 |
| 9 | " | 100:60 | " | " |
| 10 | " | 100:25 | " | 60/30/10 HPMA |
| 11 | " | " | " | 60/30/10 BDMA |
| 12 | " | " | " | 60/30/10 HEMA |
| 13 | " | " | " | 60/30/10 IEM-CL |
| 14 | " | " | " | 65/30/5 AA |
| 15 | 0.33 | " | 90/0/10 | 60/30/10 HPMA |
| 16 | 0.49 | " | " | " |
| 17 | 0.38 | " | " | 70/30/0 |

*S: styrene; AN: acrylonitrile; BD: butadiene; HPMA: 2-hydroxypropyl methacrylate; BDMA: 1,4-butanediol monoacrylate; HEMA: 2-hydroxyethyl methacrylate; IEM-CL: 2-(isocyanatoethyl) methacrylate-caprolactam adduct; AA: allyl alcohol

EXAMPLES 18-32 AND CONTROL

Caprolactam Dispersions

By Method A of Example 3, the caprolactam dispersion of Examples 18-32 set forth in Table 2 are prepared. Examples 25-31 contain a 1:1 mixture of a core-shell polymer of butadiene-styrene and one containing interactive comonomers which permit grafting of the caprolactam onto the shell. The Control is similarly prepared, except that no core-shell polymer is added. The dispersions are storage stable for a period of at least 2 weeks.

TABLE 2

| | | Caprolactam Dispersion | | |
|---|---|---|---|---|
| Ex. | Core-shell polymer Example | core-shell polymer* | capro-lactam* | isophthaloyl bis-caprolactam initiator* |
| Control | — | — | 90.1 | 0.9 |
| 18 | 5 | 12.5 | 72.5 | 0.8 |
| 19 | 10 | 12.5 | 72.5 | 0.8 |
| 20 | 5 | 14.6 | 70.4 | 0.8 |
| 21 | 6 | " | " | " |
| 22 | 7 | " | " | " |
| 23 | 8 | " | " | " |
| 24 | 9 | " | " | " |
| 25 | 5 | 7.3 | " | " |
| | 10 | 7.3 | " | " |
| 26 | 5 | 7.3 | " | " |
| | 11 | 7.3 | " | " |
| 27 | 5 | 7.3 | " | " |
| | 12 | 7.3 | " | " |
| 28 | 5 | 7.3 | " | " |
| | 13 | 7.3 | " | " |
| 29 | 5 | 7.3 | " | " |
| | 14 | 7.3 | " | " |
| 30 | 5 | 7.3 | " | " |
| | 15 | 7.3 | " | " |
| 31 | 5 | 7.3 | " | " |
| | 16 | 7.3 | " | " |
| 32 | 17 | 24.1 | 61.0 | 0.7 |

*part per 100 parts final reaction mixture comprising dispersion and catalyst solution

EXAMPLES 17-28 AND CONTROL

Rubber Modified Nylon-6

Rubber modified nylon-6 polymers, which are according to the invention, and the Control and Example 22, which are not according to the invention, are prepared by the method of Example 4. The polymers are subjected to mechanical testing. The data are set forth in Table 3 and demonstrate a significant increase in impact strength in comparison with the control without significant loss in flexural modulus.

TABLE 3

| Caprolactam Dispersion | Nylon-6 Polymer (core:N6 ratio) | Flex Modulus (MPa) | Impact Strength (J/m) | Exotherm (°C./secs.) |
|---|---|---|---|---|
| Control | 0:100 | 2827 | 37.5 | |
| 18 | 10:87.5 | 2669 | 129 | 171/210 |
| 19 | 10:87.5 | 2669 | 134 | 169/260 |
| 20 | 12:85 | 2345 | 128.5 | 172/240 |
| 21 | " | 1945 | 107.0 | 169/360 |
| 22 | " | * | * | ** |
| 23 | " | 2297 | 85.7 | 173/148 |
| 24 | " | 2103 | 58.9 | 171/150 |
| 25 | " | 2103 | 289.1 | 173/167 |
| 26 | " | 2614 | 107.1 | 171/300 |
| 27 | " | 2566 | 107.1 | 171/210 |
| 28 | " | 2179 | 166.0 | 165/360 |
| 29 | " | 2441 | 58.9 | 170/155 |
| 30 | " | 2655 | 64.2 | 172/200 |
| 31 | " | 2614 | 53.5 | 171/206 |
| 32 | 20:75 | 1697 | 494 | 169/305 |

*The shell of the core-shell polymer of Example 22 contains only styrene and no polar or reactive comonomer and is too viscous to pour or pumpcast.

I claim:

1. A process for the preparation of a dispersion in caprolactam of a core-shell polymer consisting of a crosslinked rubber core and a thermoplastic polymer shell having a glass transition temperature of at least 35° C., which comprises adding an aqueous dispersion of said core-shell polymer to an aqueous solution of caprolactam, stirring the mixture to provide a uniform dispersion, and evaporating water from the mixture to provide said dispersion.

2. The process of claim 1 wherein the water is evaporated at a temperature of about 90° to 100° C. with a nitrogen stream.

3. The process of claim 1 wherein after the water is evaporated, there is added a caprolactam-soluble polymerization-initiating amount of caprolactam polymerization initiator selected from the group represented by the formula

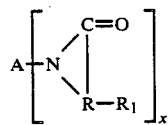

where A is CO, CS, B(CO)$_x$, B(CS)$_x$, B(NHCO)$_x$,

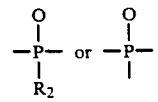

where B is a $C_1$ to $C_{30}$ hydrocarbyl radical, where x is in the range of 2 to 4, where R is a $C_4$ to $C_{11}$ alkylene or oxoalkylene radical, $R_1$ is hydrogen or a $C_1$ to $C_4$ alkyl radical and $R_2$ is a $C_1$ to $C_{10}$ hydrocarbyl radical.

4. The process of claim 1 wherein after the water is evaporated, there is added an effective amount of a caprolactam polymerization catalyst selected from the group consisting of lactam magnesium halides and alkali metal lactamates.

* * * * *